(12) United States Patent
Kalish et al.

(10) Patent No.: US 11,076,198 B2
(45) Date of Patent: Jul. 27, 2021

(54) SYSTEM AND METHOD TO GENERATE AN INTERACTIVE VIDEO ON THE FLY

(71) Applicant: IDOMOO LTD, Hod Hasharon (IL)

(72) Inventors: Danny Kalish, Raanana (IL); Idan Shenberg, Aseret (IL)

(73) Assignee: IDOMOO LTD., Hod Hasharon (IL)

( * ) Notice: Subject to any disclaimer, the term of this patent is extended or adjusted under 35 U.S.C. 154(b) by 0 days.

(21) Appl. No.: 14/723,536

(22) Filed: May 28, 2015

(65) Prior Publication Data
US 2016/0351228 A1  Dec. 1, 2016

(51) Int. Cl.
| | |
|---|---|
| G11B 27/031 | (2006.01) |
| G11B 27/11 | (2006.01) |
| H04N 21/81 | (2011.01) |
| H04N 21/8541 | (2011.01) |
| H04N 21/8405 | (2011.01) |
| H04N 21/8549 | (2011.01) |
| H04N 21/2743 | (2011.01) |
| H04N 21/431 | (2011.01) |
| H04N 1/00 | (2006.01) |
| H04L 12/18 | (2006.01) |

(52) U.S. Cl.
CPC ....... *H04N 21/4316* (2013.01); *G11B 27/031* (2013.01); *G11B 27/11* (2013.01); *H04L 12/1813* (2013.01); *H04L 12/1818* (2013.01); *H04N 1/00196* (2013.01); *H04N 21/2743* (2013.01); *H04N 21/431* (2013.01); *H04N 21/8133* (2013.01); *H04N 21/8405* (2013.01); *H04N 21/8541* (2013.01); *H04N 21/8549* (2013.01)

(58) Field of Classification Search
None
See application file for complete search history.

(56) References Cited

U.S. PATENT DOCUMENTS

| | | | |
|---|---|---|---|
| 8,666,226 B1 | 3/2014 | Kalish et al. | |
| 8,702,504 B1 * | 4/2014 | Hughes | G06F 3/04842 463/29 |
| 9,032,465 B2 | 5/2015 | Perlman et al. | |
| 9,253,533 B1 * | 2/2016 | Morgan | H04N 21/44008 |

(Continued)

*Primary Examiner* — Ricky Chin
(74) *Attorney, Agent, or Firm* — Browdy and Neimark, P.L.L.C.

(57) ABSTRACT

The present invention provides a method for real-time generation and streaming of at least one interactive context based video according to video template, raw context related data and real time event data. The method comprising the steps of: receiving input data related to an identified template and context related data, receiving real time input of event data, while the subsequent portion of video is still in generation, choosing, updating and generating audible and visual materials, according to the predefined logic of the identified template in relation to real time data event, generating and encoding video frames for pre-defined portion based polling the generated/updated visual materials, generating continuous audio streams/frames for predefined portion of the video based on polling generated or updated audible materials and providing the generated streamable data of the predefined video portion at the external entity side, while the subsequent portion of video is still in generation.

8 Claims, 10 Drawing Sheets

(56) References Cited

U.S. PATENT DOCUMENTS

| | | | |
|---|---|---|---|
| 2002/0067376 A1* | 6/2002 | Martin | G06Q 30/02 |
| | | | 715/810 |
| 2002/0133562 A1* | 9/2002 | Newnam | G06Q 30/02 |
| | | | 709/216 |
| 2003/0177501 A1* | 9/2003 | Takahashi | G09G 5/14 |
| | | | 725/110 |
| 2004/0078814 A1* | 4/2004 | Allen | H04N 5/44513 |
| | | | 725/47 |
| 2004/0255249 A1* | 12/2004 | Chang | G06F 17/30796 |
| | | | 715/723 |
| 2005/0160367 A1* | 7/2005 | Sirota | G06Q 10/109 |
| | | | 715/753 |
| 2006/0200842 A1* | 9/2006 | Chapman | H04N 7/163 |
| | | | 725/34 |
| 2007/0157248 A1* | 7/2007 | Ellis | H04N 5/445 |
| | | | 725/47 |
| 2009/0094632 A1 | 4/2009 | Newnam et al. | |
| 2010/0058410 A1* | 3/2010 | Rance | H04N 7/173 |
| | | | 725/109 |
| 2011/0296048 A1 | 1/2011 | Knox et al. | |
| 2011/0093784 A1 | 4/2011 | Kiraz et al. | |
| 2012/0254456 A1 | 10/2012 | Visharam et al. | |
| 2012/0284625 A1* | 11/2012 | Kalish | G11B 27/034 |
| | | | 715/723 |
| 2013/0007201 A1 | 1/2013 | Jeffrey et al. | |
| 2013/0031582 A1* | 1/2013 | Tinsman | H04N 21/4316 |
| | | | 725/36 |
| 2013/0103814 A1* | 4/2013 | Carrasco | H04L 65/4092 |
| | | | 709/223 |
| 2013/0212487 A1* | 8/2013 | Cote | G06F 9/451 |
| | | | 715/745 |
| 2013/0275557 A1 | 10/2013 | Myers et al. | |
| 2014/0331113 A1* | 11/2014 | Vaccarella | G06Q 30/00 |
| | | | 715/202 |
| 2015/0340067 A1* | 11/2015 | Kalish | G11B 20/00007 |
| | | | 386/285 |
| 2016/0066051 A1* | 3/2016 | Caidar | H04N 21/47805 |
| | | | 725/60 |
| 2016/0117722 A1* | 4/2016 | Garcia | G06Q 50/10 |
| | | | 705/14.49 |
| 2016/0170955 A1* | 6/2016 | Choi | G06F 17/248 |
| | | | 715/243 |
| 2016/0212455 A1* | 7/2016 | Manna | H04N 21/23424 |
| 2017/0223082 A1* | 8/2017 | Marcus | H04L 65/60 |

* cited by examiner

Figure 1

200 | Video Generation API module

210 Receiving (a Hyper Text Transfer Protocol (HTTP) e.g. ) request that is containing a template identifier and required template input text

220 Receiving and Validating input data related to the identified template based on user profile data

230 Translating input data into a valid canonical entity, formatted to be handled by various modules of the platform

240 Sending the valid canonical entity to a video generation-management module

250 Conveys the generated video stream meta-data ( Unique ID ) back to the remote entity that originated the video generation request

600 Video Rendering Module

Launched by the Video Generation Management Module    610

This module repeatedly polls for input data created by a single or multiple executions of the video material preparation module. Input data is processed according to it's chorological and programmaticall order.    620

Responsible for incorporating visual materials into a set of viode templates As determined during the Visual and Audible materials preparation module.    630

The module's product are rendered video frames. Each Video frame rendered is piped to the video encoding modules according to its chronological order video in the video    640

Interactive video module

Continuesly Polled by the an instance of the video generation management request for interactive/dynamic data events — 910

Both User Driven and mechanized Interactive events are transmitted to this module using a predefined HTTP RESt API. Each events is associated with a specific video generation process/video stream — 920

Each interactive event is identified by a unique event type , and processed by a matching interactive handling mechanism — 930

Processed events are formalized to canonical form that is consumed by the video generation management instance as part of its polling cycle — 940

This is a stand-alone module responsible for managing interactive/dynamic data events and data extraction mechanisms. Each video generation management process can poll this module and receive real-time data based on a pre-defined set of mechanisms. — 950

SYSTEM AND METHOD TO GENERATE AN INTERACTIVE VIDEO ON THE FLY

BACKGROUND

Technical Field

The present invention relates generally to generation of context based video files based on predefined templates. More particularly, the present invention relates to on the fly generation of context based video.

BRIEF SUMMARY

The present invention provides a method for real-time generation and streaming of interactive context based video according to video template, raw context related data and real time event data. The method comprising the steps of: receiving input data related to at least one identified template and context related data, polling real time input of event data, while the subsequent portion of video is still in generation, choosing, updating and generating audible and visual materials, according to the predefined logic of the identified template and real time data event, generating and encoding video frames for pre-defined portion based polling the generated/updated visual materials, generating continuous audio streams/frames for predefined portion of the video based on polling generated or updated audible materials and providing streamable data of the predefined video portion at the external entity side, while the subsequent portion of video is still in generation.

According to some embodiments of the present invention each interactive event is identified by a unique event type and processed by a matching interactive handling mechanism.

According to some embodiments of the present invention the processed events are formalized to canonical form that is consumed by the video generation management instance as part of its polling cycle.

According to some embodiments of the present invention the event data is received from external sources.

According to some embodiments of the present invention the event data is based on actions performed by at least one user while viewing the streamed video.

According to some embodiments of the present invention the user's actions are reactions to triggers appearing in real-time in the streamed video, wherein the reaction include at least one of: user selected choice from given option, user pointing/touching at predefined location in the movie frame.

According to some embodiments of the present invention the video streaming is paused while waiting for user action.

According to some embodiments of the present invention while waiting for user action, is streamed predefined video scene.

According to some embodiments of the present invention the event data is based on identifying and analyzing behavior of at least one user while viewing the streamed video.

According to some embodiments of the present invention the update is initiated at predefined points based on template definition.

According to some embodiments of the present invention the update is initiated based on received events data.

The present invention provides a system for real-time generation and streaming of interactive context based video according to video template, raw context related data and real time event data. The system comprising of: Video Generation API module for receiving input data related to at least one identified template and context related data, Interactive video module for polling real time input of event data, while the subsequent portion of video is still in generation, Visual and audio material preparation modules choosing, updating and generating audible and visual materials, according to the predefined logic of the identified template and real time data event, Encoding module for generating and encoding video frames for pre-defined portion based polling the generated/updated visual materials, generating continuous audio streams/frames for predefined portion of the video based on polling generated or updated audible materials and Interactive Video Stream Management module for providing streamable data of the predefined video portion at the external entity side, while the subsequent portion of video is still in generation.

These, additional, and/or other aspects and/or advantages of the present invention are: set forth in the detailed description which follows; possibly inferable from the detailed description; and/or learnable by practice of the present invention.

BRIEF DESCRIPTION OF THE SCHEMATICS

The present invention will be more readily understood from the detailed description of embodiments thereof made in conjunction with the accompanying drawings of which.

DETAILED DESCRIPTION OF THE VARIOUS MODULES SCHEMATICS

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

Figure 1:
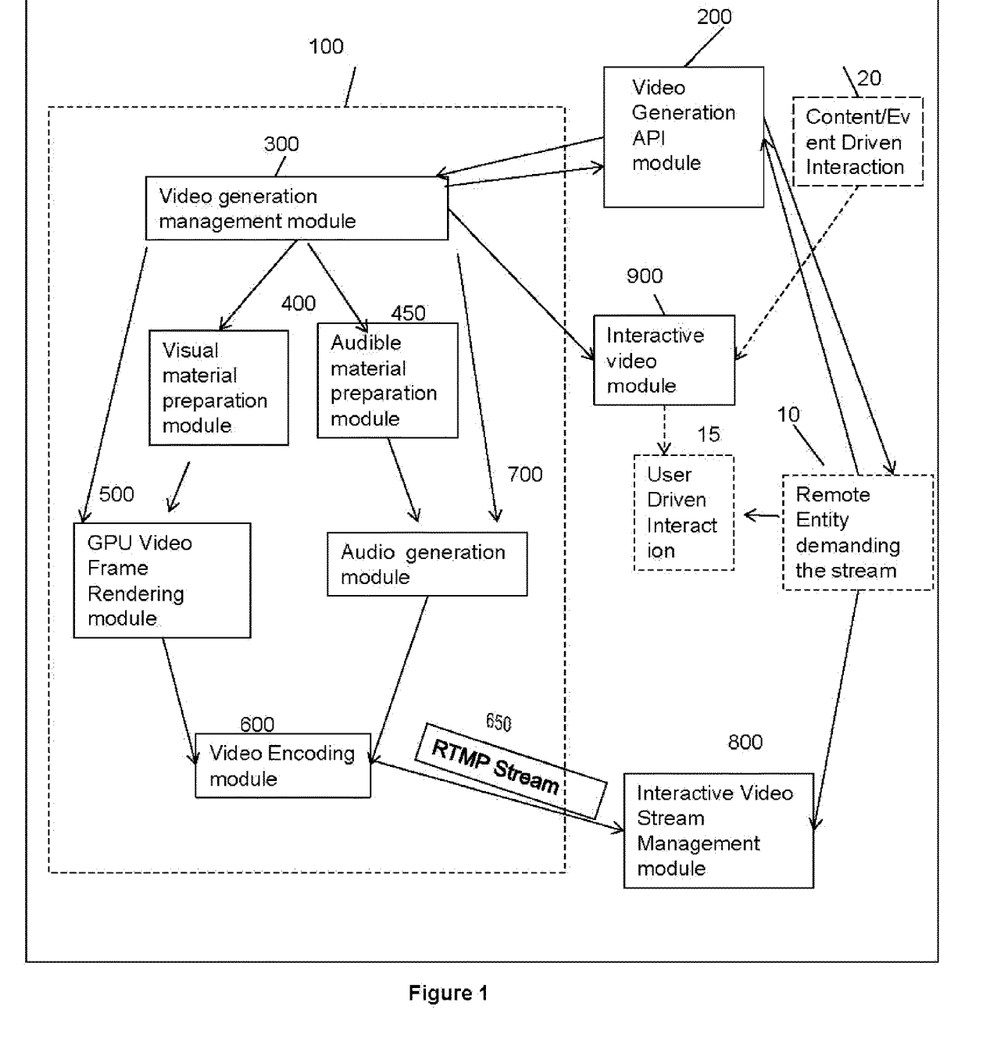
FIG. 1 is a block diagram of real-time video generation process, according to some embodiments of the invention.

FIG. 1 is a block diagram of real-time video generation processing system, according to some embodiments of the invention. The system is implemented by at least one processor unit using different internal modules in communication with different user external module which can be implemented at personal processing device using such as computer, laptop or smart phones or at external servers. The system is comprised of video generation API computer module 200 for receiving remote entity 10 request such as computer terminal, server for video generation, the request is conveyed, to the video generation management computer module 300 for initiating and managing the video on the fly processing. Throughout the video generation and streaming, the interactive video module 900 polls user derived interaction interface 15 of personal computer device such as keyboard, mouse, touch screen etc. and content/event driven interaction 20 from any external information source such as network server where the content or event may include news website or remote sensors data and conveys polled information of the event/interaction data to the video generation module 300. Once the video process is initiated, the video generation is started, the visual and audible preparation modules (400, 450) are invoked for preparing the material, based on the identified template and events types received from the interactive video module 900. The audio generation module 700 and the GPU video frame rendering module 500 poll the audio and visual data from the audio material preparations module (450) and the visual material preparations module(400), material is ready for creating audio stream and video frames to be conveyed to the encoding module 600. The encoding module creates an RTMP stream 650 based on generated video frames and audio sequence/stream, the stream is conveyed to the interactive video stream management module 800.

Figure 2:
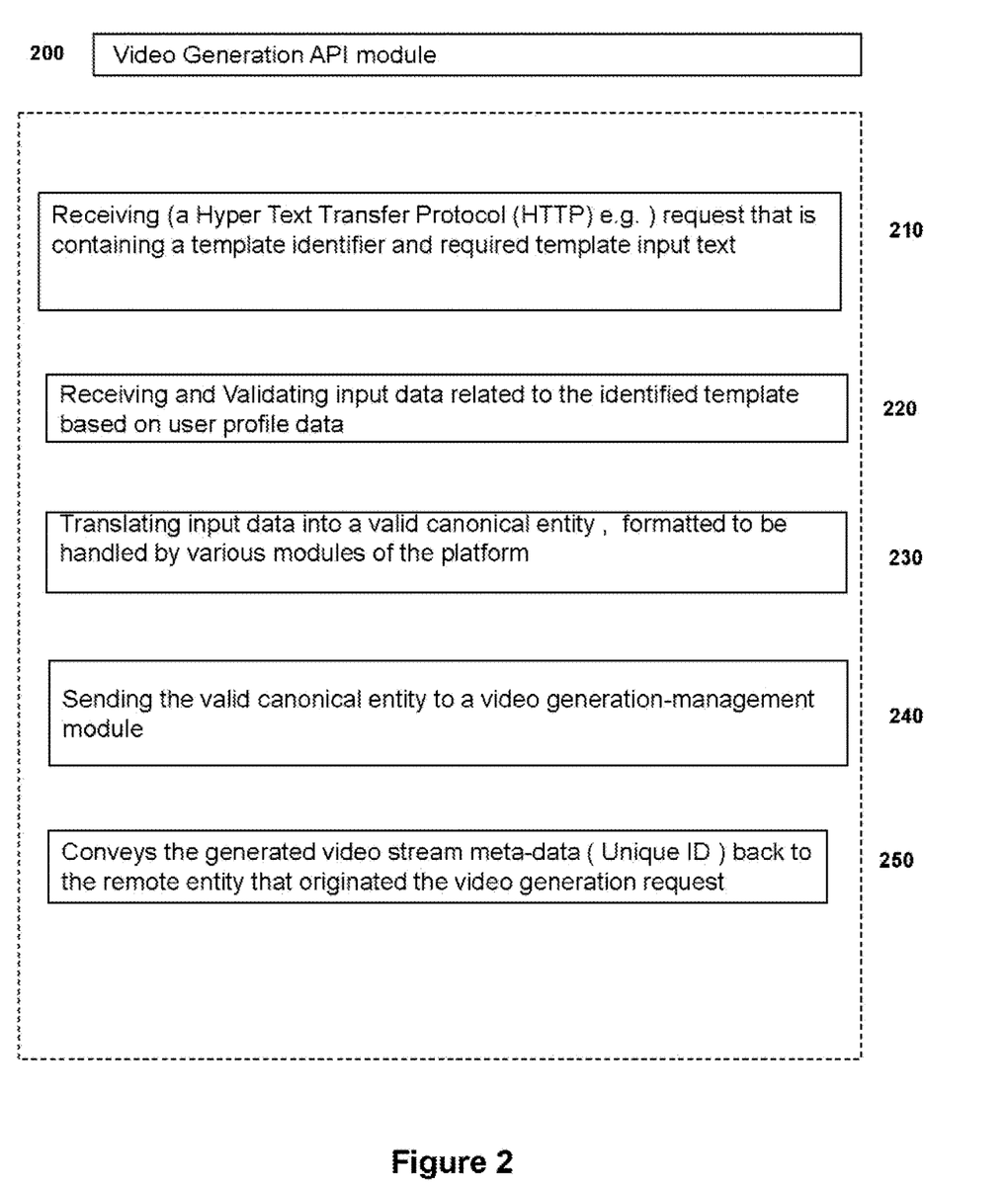
FIG. 2 is a flowchart diagram of Video Generation API module, according to some embodiments of the invention.

FIG. 2 is a flowchart diagram of Video Generation API module, according to some embodiments of the invention. The video generation API module receives (210) a request such as Hyper Text Transfer Protocol (HTTP), that is containing a template identifier and required template input text from remote entity 10. According to the identified template the module, retrieves and validates input data based on custom template identifier and user profile data (220). At the next step the input data is translated into a valid canonical entity, formatted to be handled by various modules of the platform (230). The valid canonical entity is sent to a video generation-management module (240). Once the at least part of the video stream meta-data (Unique ID) is ready, it is conveyed back to the remote entity 10 that originated the video generation request(250).

Figure 3:
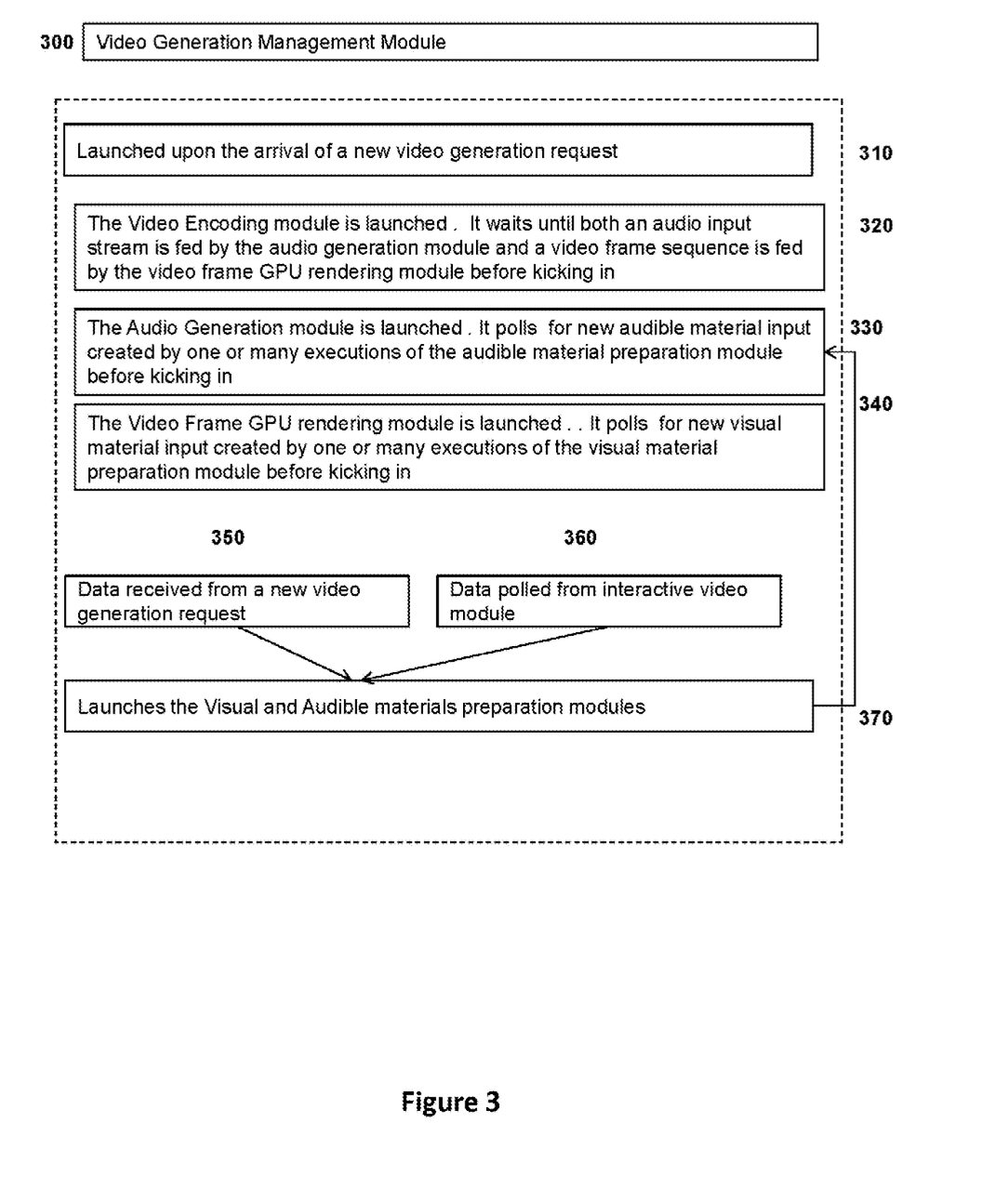
FIG. 3 is a flowchart diagram of Video Generation Management module, according to some embodiments of the invention.

FIG. 3 is a flowchart diagram of Video Generation Management module, according to some embodiments of the invention. The video Generation Management module is launched upon the arrival of a new video generation request (310). The module coordinates the launching and/or operating of the video encoding module, Audio Generation module and the Video Frame GPU rendering module. The encoding module is kicked of once both an audio input stream is fed by the audio generation module and a video frame sequence is fed by the video frame GPU rendering module (320). The Audio Generation module is launched when polling new audible material input created by one or many executions of the audible material preparation module (330). The Video Frame GPU rendering module is launched once polling new visual material input created by one or many executions of the visual material preparation module (340). The Video Generation Management module receives input data from a new video generation request (350) or Data polled from interactive video module (360). Based on received new video request or new event data are launched the preparation modules (370). At first the preparation modules are launched when a new request is received, starting to generate all material items according to sequence order as defined by video template logic. Each time new event data arrives, the preparation modules are activated to update, choose or generate materials items, required according predefined logic in relation to received event type and information.

Figure 4:
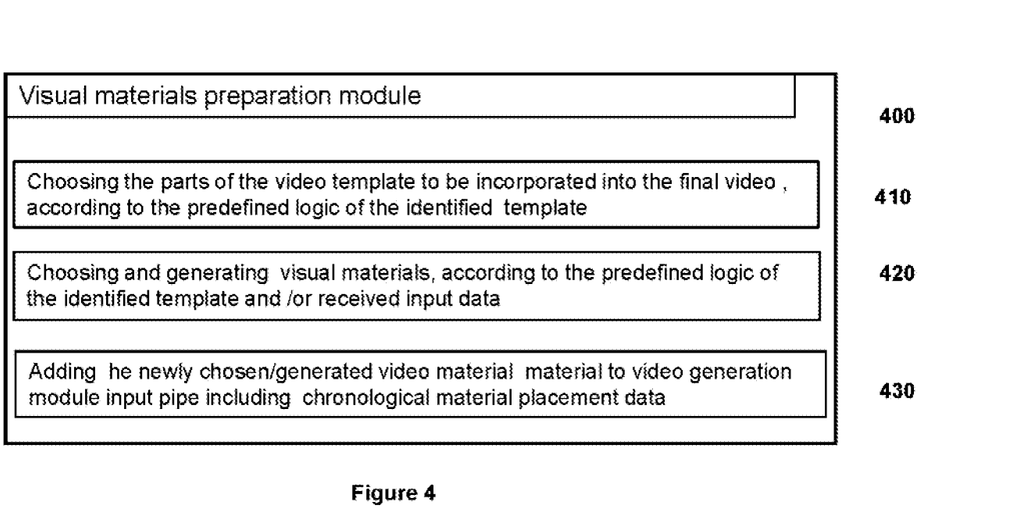
FIG. 4 is a flowchart diagram of Visual materials preparation, according to some embodiments of the invention.

FIG. 4 is a flowchart diagram of Visual materials preparation, according to some embodiments of the invention. Once launched by the Video Generation Management module, the module selects the parts of the video template to be incorporated into the final video, according to the predefined logic of the identified template (410) and generates visual materials, according to the predefined logic of the identified template and/or received input data (420). The predefined logic includes rules which define, in relation to received event data to determine, if and what new video materials or update of video material are required. The newly chosen or generated video material is added to video generation module input pipe including chronological material placement data (430).

Figure 4A:
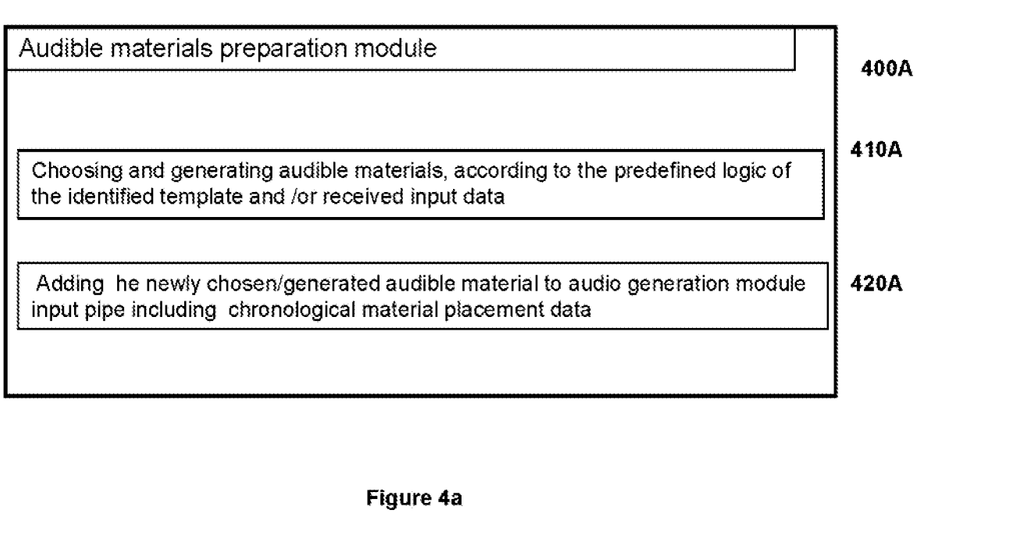
FIG. 4A is a flowchart diagram of Audible materials preparation module, according to some embodiments of the invention.

FIG. 4A is a flowchart diagram of Audible materials preparation module, according to some embodiments of the invention. Once launched by the Video Generation Management module, the module selects and generates audible materials, according to the predefined logic of the identified template and/or received input data (410A). The predefined logic include rules which define, in relation to received event data to determine, if and what new video materials or update of video material are required. The newly chosen/generated audible material is added to the audio generation module input pipe including chronological material placement data (420A).

Figure 5:
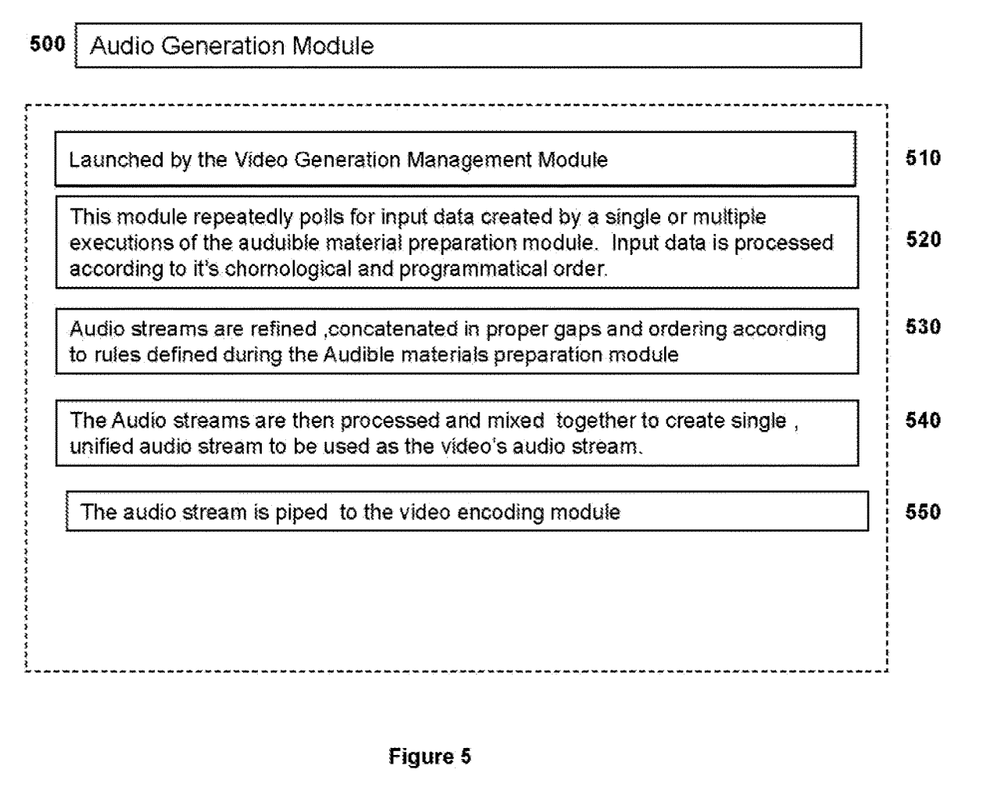
FIG. 5 is a flowchart diagram of Audio Generation Module, according to some embodiments of the invention.

FIG. 5 is a flowchart diagram of Audio Generation Module, according to some embodiments of the invention. This module is launched by the Video Generation Management Module (510). The module repeatedly polls for input data created by a single or multiple executions of the audible material preparation module. Input data is processed according to it's chronological and programmatical order (520). At the next step the audio streams are refined, concatenated in proper gaps and ordering according to rules defined during the Audible materials preparation module (530). At the last step the Audio streams are then processed and mixed together to create a single, unified audio stream to be used as the video's audio stream (540) and piping audio stream to the video encoding module (550).

Figure 6:
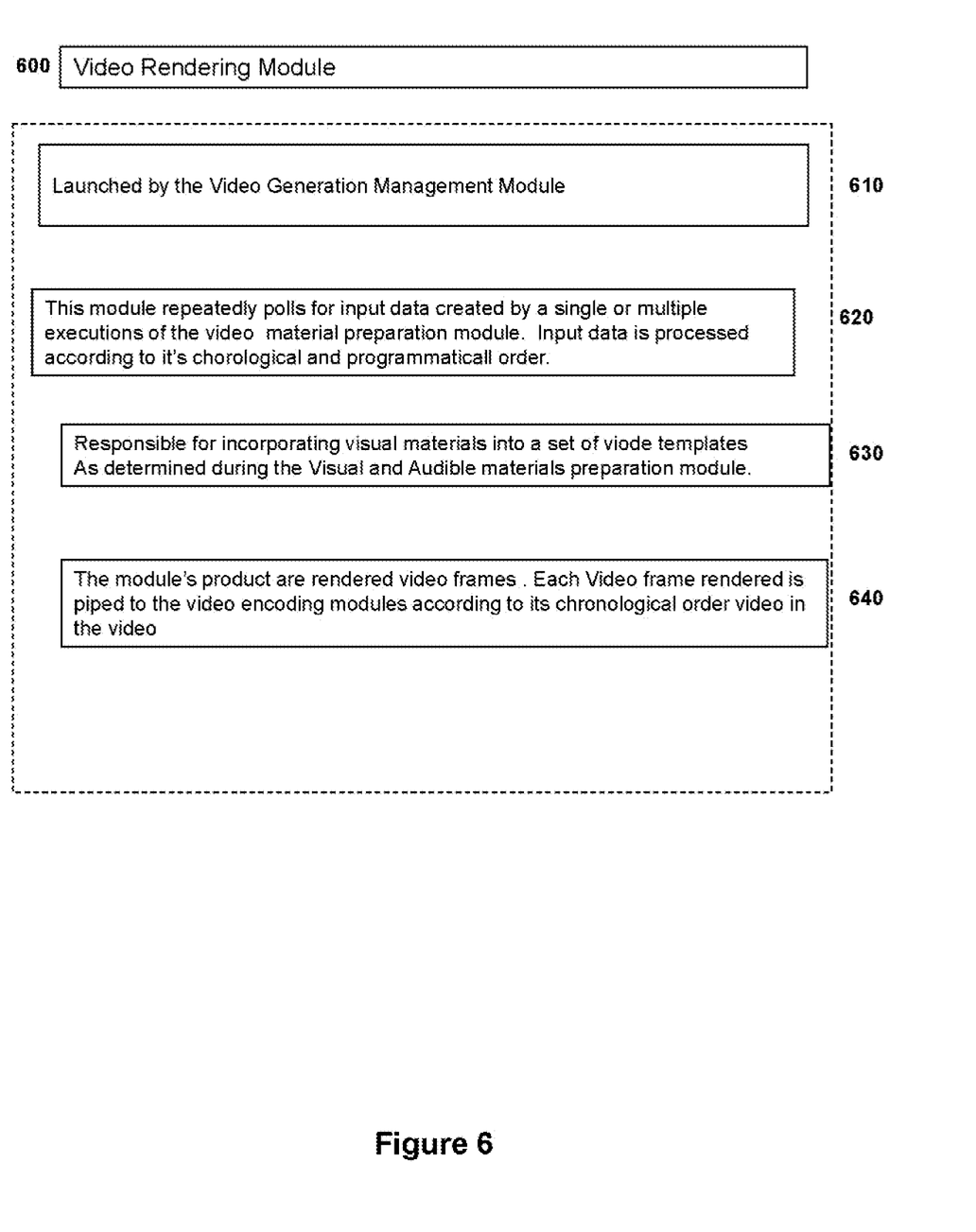
FIG. 6 is a flowchart diagram of Video Rendering module, according to some embodiments of the invention.

FIG. 6 is a flowchart diagram of Video Rendering module, according to some embodiments of the invention. This module is launched by the Video Generation Management Module (610) and repeatedly polls for input data created by a single or multiple executions of the video material preparation module. Input data is processed according to it's chorological and programmaticall order (620). At the next step, the module incorporates visual materials into a set of video templates as determined during the Visual and Audible materials preparation module (630). The module's products are rendered video frames. Each rendered Video frame is piped to the video encoding modules according to its chronological order in the video (640).

Figure 7:
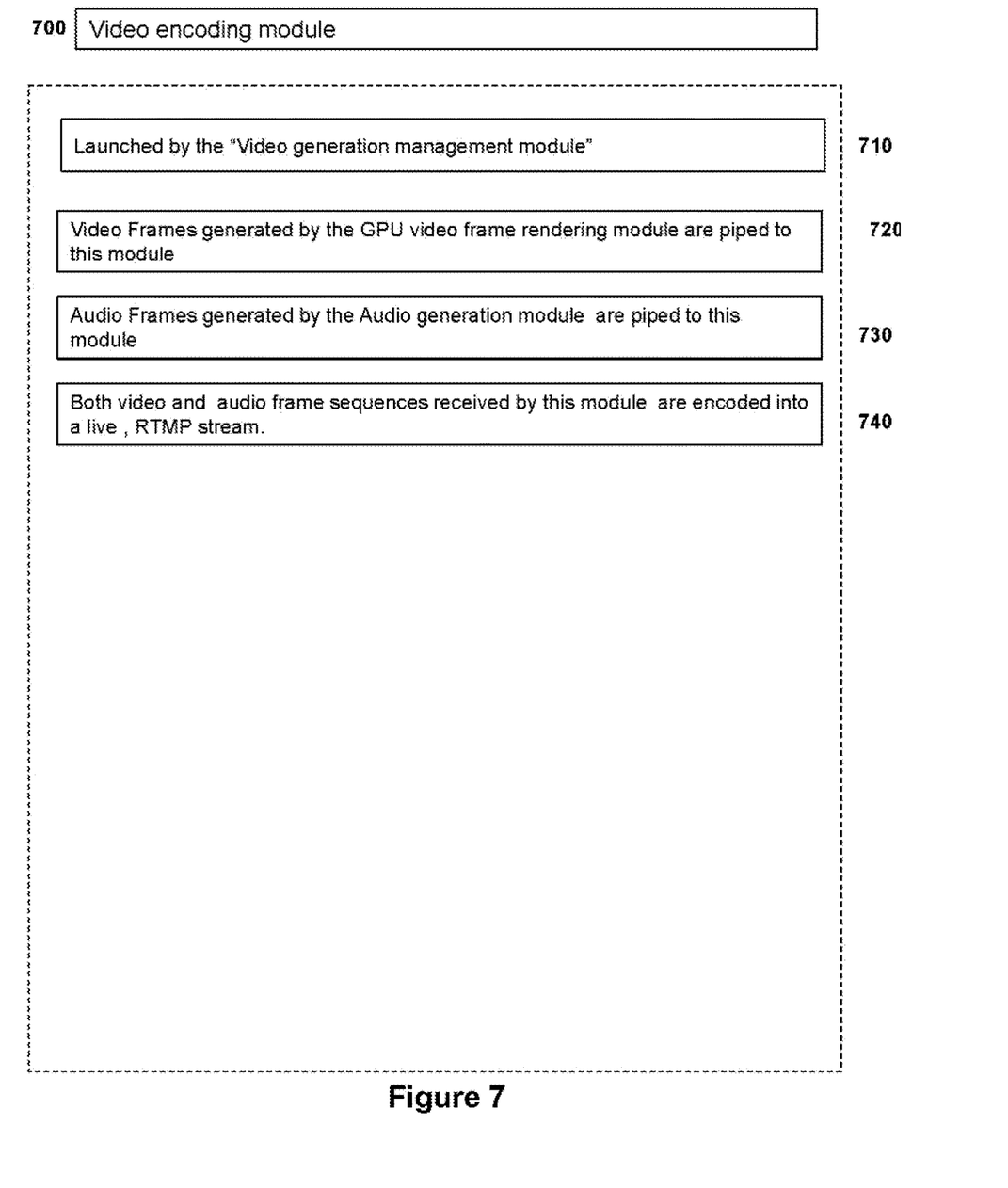
FIG. 7 is a flowchart diagram of Video encoding module, according to some embodiments of the invention.

FIG. 7 is a flowchart diagram of Video encoding module, according to some embodiments of the invention. This module is launched by the Video generation management module (710), receiving video Frames generated by the GPU video frame rendering module (720) and audio Frames generated by the Audio generation module (730). Both video and audio frames sequences received by this module are encoded into a live RTMP stream (740).

Figure 8:
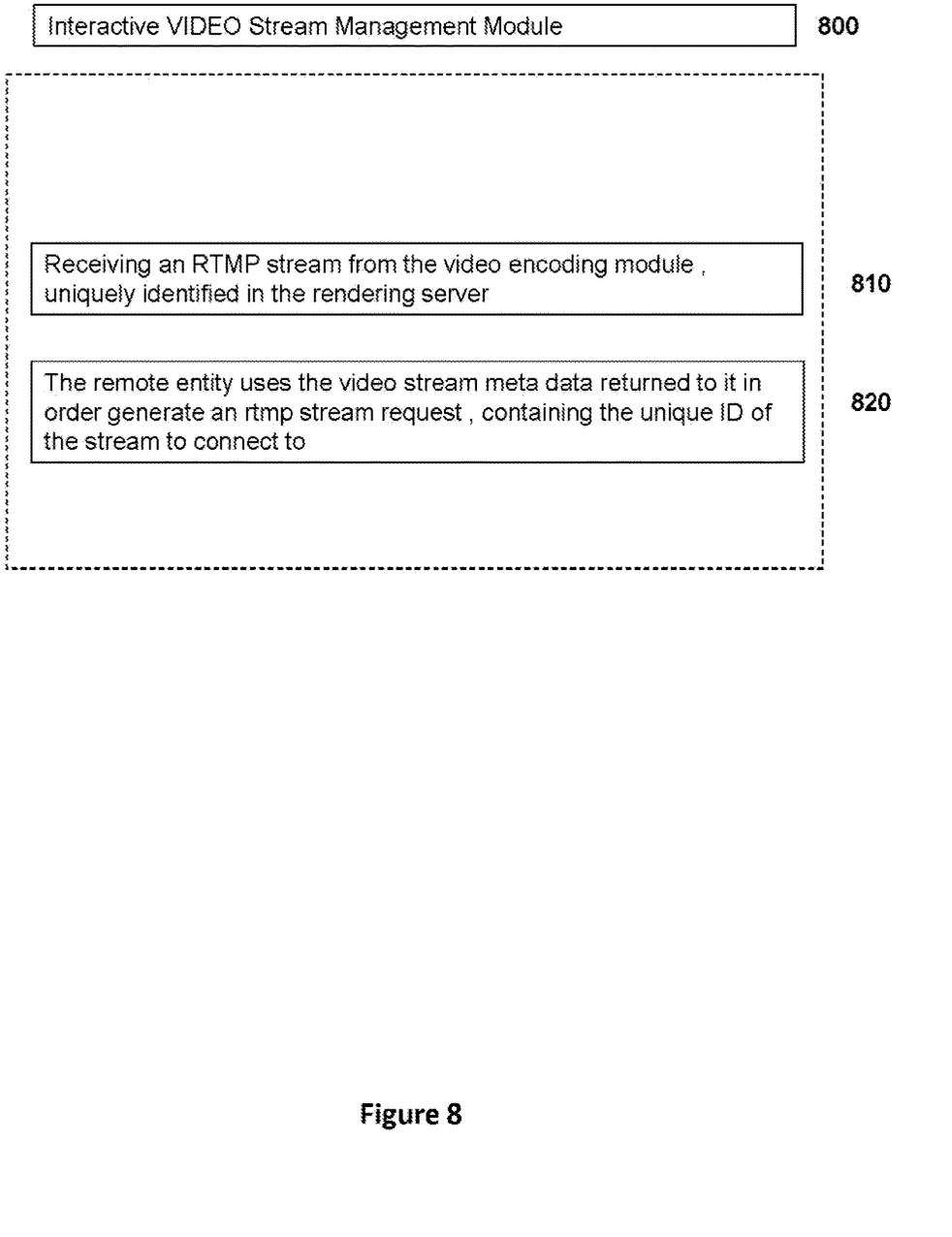
FIG. 8 is a flowchart diagram of Interactive VIDEO Stream Management module, according to some embodiments of the invention.

FIG. 8 is a flowchart diagram of Interactive VIDEO Stream Management module, according to some embodiments of the invention. This module receives an RTMP stream from the video encoding module, uniquely identified in the rendering server (810), enabling the remote entity (10) to use the video stream meta data which is returned to it in order, generating an RTMP stream request, containing the unique ID of the stream to connect to (820).

Figure 9:
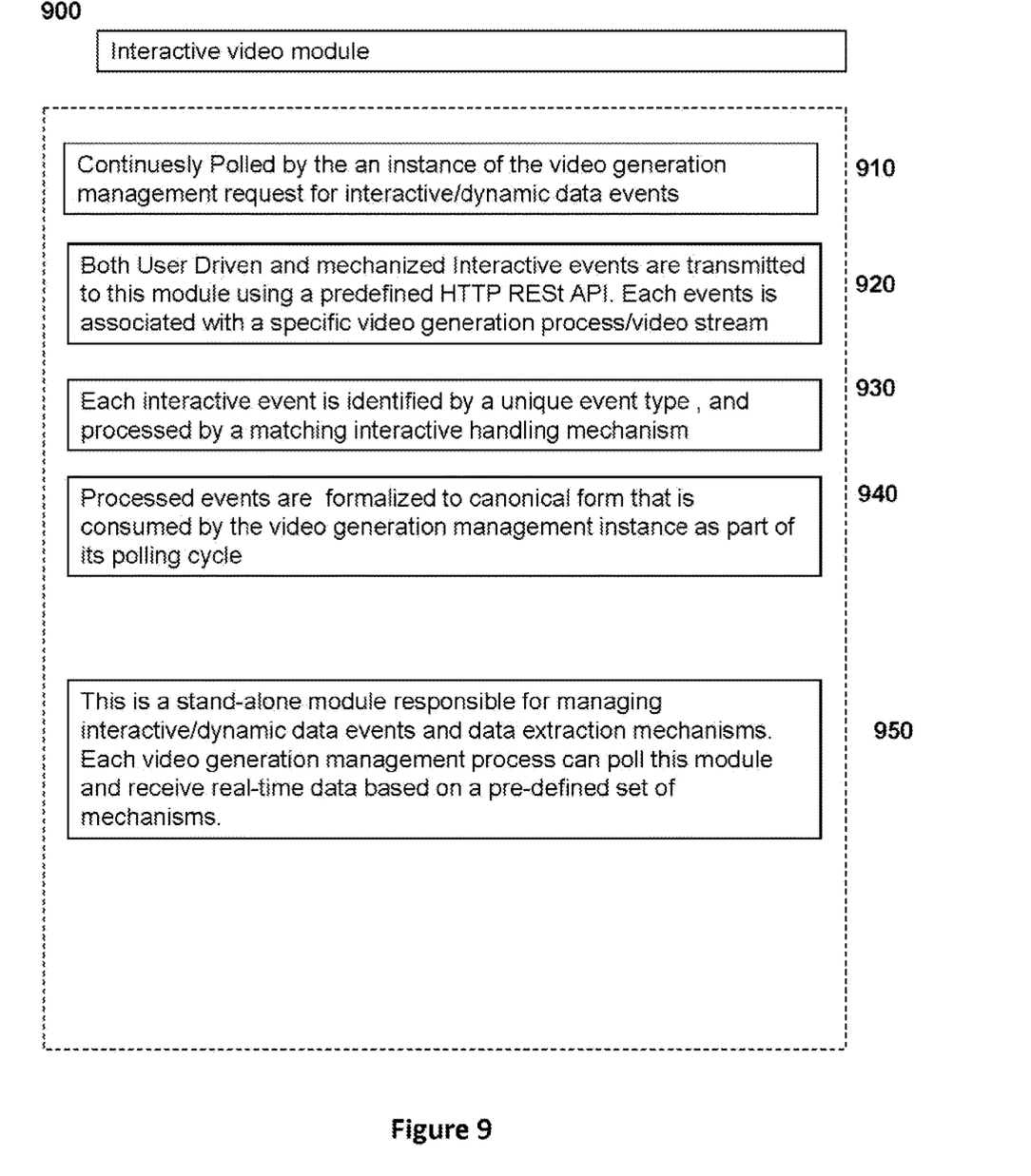
FIG. 9 is a flowchart diagram of Interactive video module, according to some embodiments of the invention.

FIG. 9 is a flowchart diagram of Interactive video module, according to some embodiments of the invention. This module is continuously polled by the instance of the video generation management request for interactive/dynamic data events (910). Both User Driven events, such user selections or input data inserted by typing or voice and mechanized Interactive events such as sensor data or identified events external information sources such the Internet are transmitted to this module using a predefined HTTP REST API. Each event is associated with a specific video generation process/ video stream (920). Each interactive event is identified by a unique event type, and processed by a matching interactive handling mechanism (930) not clear. The matching interactive handling mechanism match event characteristics such as environmental condition e.g. weather, news event to the type event. The processed events are formalized to canonical form that is consumed by the video generation management instance as part of its polling cycle (940). This is a stand-alone module which is process and manage interactive/ dynamic data events and data extraction mechanisms based on identified event type. Each video generation management process can poll this module and receive real-time event data based on a pre-defined set of data extraction mechanisms. For example, data extraction mechanism may include checking current weather at specified location, current local time, news updates in specific subject, receiving data form environmental sensors or incoming data from the user interaction video module as described bellow.

Figure 10:
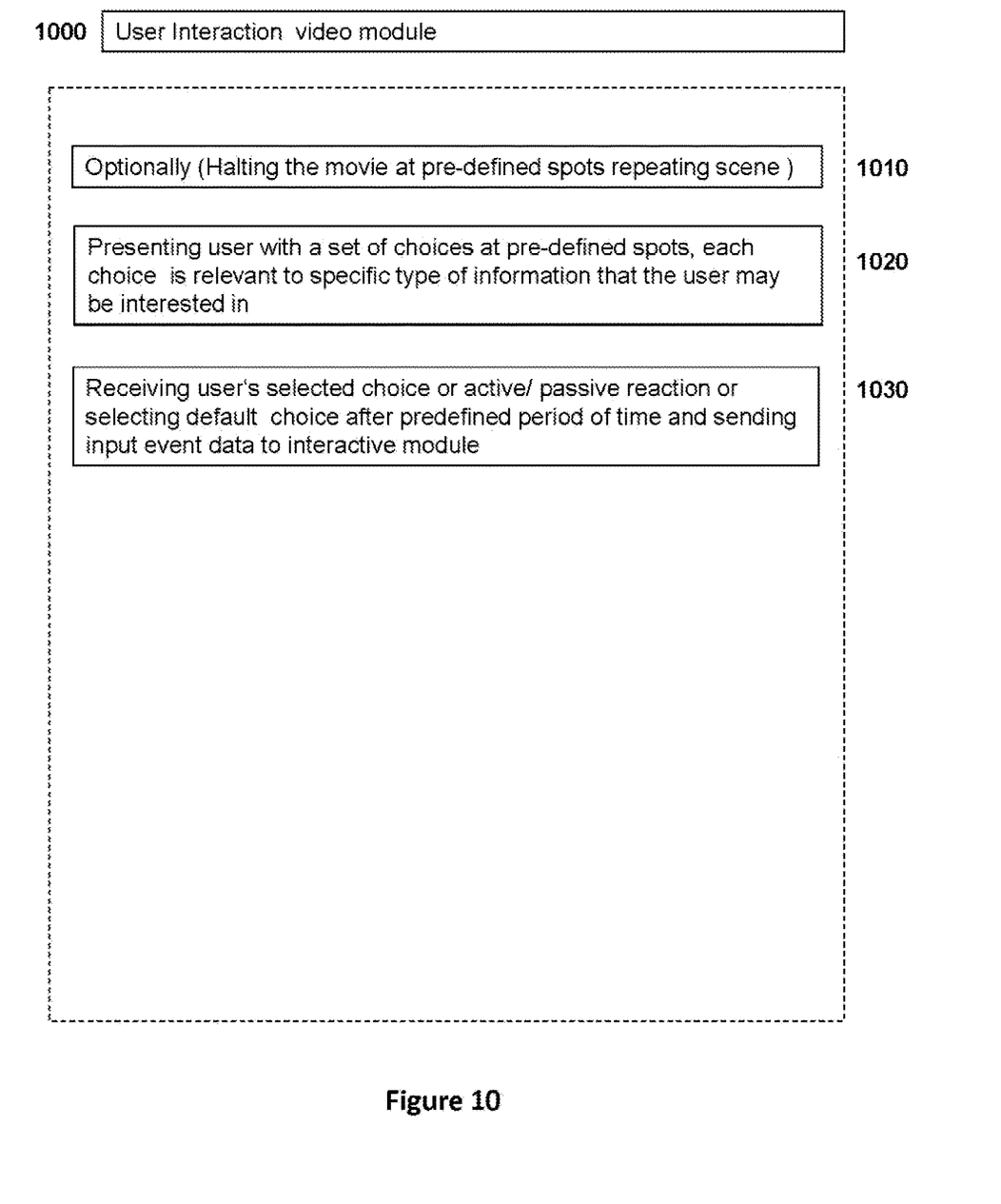
FIG. 10 is a flowchart diagram of User Interaction video module, according to some embodiments of the invention.

FIG. 10 is a flowchart diagram of User Interaction video module, according to some embodiments of the invention. This module an example of user interaction, while in interactive video is displayed: Halting the movie at pre-defined spots at predefined scene or prompting the user with interaction icon (1010), presenting user with a set of choices at pre-defined spots, each choice is relevant to specific type of information that the user may be interested in (1020), Receiving user's selected choice or active/passive reaction or selecting default choice after predefined period of time and sending input event data to interactive module (1030), or analyzing continuously or at predefined spots user behavior by using sensors (e.g. camera microphone, acceleration, gyro, temp) and sending measurements results to interactive module when exceeding predefined thresholds.

The system of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may wherever suitable operate on signals representative of physical objects or substances.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of a computer or computing system, or processor or similar electronic computing device, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware, if desired, using conventional techniques. Conversely, components described herein as hardware may, alternatively, be implemented wholly or partly in software, if desired, using conventional techniques.

Included in the scope of the present invention, inter alia, are electromagnetic signals carrying computer-readable instructions for performing any or all of the steps of any of the methods shown and described herein, in any suitable order; machine-readable instructions for performing any or all of the steps of any of the methods shown and described herein, in any suitable order; program storage devices readable by machine, tangibly embodying a program of instructions executable by the machine to perform any or all of the steps of any of the methods shown and described herein, in any suitable order; a computer program product comprising a computer useable medium having computer readable program code, such as executable code, having embodied therein, and/or including computer readable program code for performing, any or all of the steps of any of the methods shown and described herein, in any suitable order; any technical effects brought about by any or all of the steps of any of the methods shown and described herein, when performed in any suitable order; any suitable apparatus or device or combination of such, programmed to perform, alone or in combination, any or all of the steps of any of the methods shown and described herein, in any suitable order; electronic devices each including a processor and a cooperating input device and/or output device and operative to perform in software any steps shown and described herein; information storage devices or physical records, such as disks or hard drives, causing a computer or other device to be configured so as to carry out any or all of the steps of any of the methods shown and described herein, in any suitable order; a program pre-stored e.g. in memory or on an information network such as the Internet, before or after being downloaded, which embodies any or all of the steps of any of the methods shown and described herein, in any suitable order, and the method of uploading or downloading such, and a system including server/s and/or client/s for using such; and hardware which performs any or all of the steps of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any step described herein may be computer-implemented. The invention shown and described herein may include (a) using a computerized method to identify a solution to any of the problems or for any of the objectives described herein, the solution optionally include at least one of a decision, an action, a product, a service or any other information described herein that impacts, in a positive manner, a problem or objectives described herein; and (b) outputting the solution.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention which are described in the context of separate embodiments may also be provided in combination in a single embodiment.

For example, a system embodiment is intended to include a corresponding process embodiment. Also, each system embodiment is intended to include a server-centered "view" or client centered "view", or "view" from any other node of the system, of the entire functionality of the system, computer-readable medium, apparatus, including only those functionalities performed at that server or client or node.

The invention claimed is:

1. A method for real-time generation and streaming of a context based video, implemented by one or more processors operatively coupled to a non-transitory computer readable storage device, on which are stored modules of instruction code that when executed cause the one or more processors to perform, said method comprising:
receiving real time data of a plurality of events from a mechanized, non-user, external source matched to an event type;
wherein each event is associated with a specific video generation process or video stream process;
wherein each event is identified by a unique event type;
wherein each video generation process or video stream process receives real-time event data based on a predefined set of data extraction mechanisms;
wherein the pre-defined set of data extraction mechanisms comprises checking current weather at a specified location, checking current local time, or receiving data from sensors;
identifying a video generation template, comprising visual content, according to a received request from a computer terminal or remote entity, said received request including a template identifier that identifies the video generation template;
retrieving and validating input data based on the template identifier and user profile data;
generating an undivided complete video stream, only after the received request is initiated, during a specific video generation process or video stream process, based on the identified video generation template, by:
automatically selecting all parts, including at least two parts, of the visual content of the video template to be incorporated into the generated video stream, wherein the selected parts form only partial portions of the complete video stream, wherein only integration of all selected parts provides a playable video stream according to a predefined logic of the identified video generation template, said predefined logic including rules which define, in relation to received events, what new visual material is required, wherein the predefined logic is different for each identified video generation template;
choosing, generating and updating audio and visual material items and incorporating said audio and visual material items with the selected parts of the video template to complement the partial portions of the video steam to create the complete video stream, wherein only incorporation of all selected parts with the audio and visual material items provides a playable video stream according to the predefined logic of the identified video generation template in relation to the real time event data and input data, wherein each selected part of the video template is updatable with visual material items at any location of the screen;
wherein the updating of audio and visual material items is initiated at predefined time points of the video stream based on a template definition;
during the specific video generation process or video stream process, incorporating said new or updated audio or visual material items into the selected parts of the video template at any location of the screen based on said video template, by generating and encoding video frames of the single generated undivided video stream, that incorporate the selected parts of the video template including the new or updated visual material items, produced during the specific video generation process or video stream process, such that the new or updated visual material items are part of the single generated undivided video stream formed from the video frames, where all video parts and visual material items of the single generated undivided video stream are visible to a user located at any location on screen;
rendering and encoding the undivided video stream, from the selected parts of the video template incorporating the new and updated visual material items, produced during the specific video generation process or video stream process, such that that new or updated video material items are combined into a single undivided stream of video; and providing the rendered and encoded video stream to an external entity, wherein the rendered and encoded video stream is a portion of a longer streamed video, while a subsequent portion of the longer streamed video is still in generation.

2. The method of claim 1, wherein the event type is identified by a match handling mechanism.

3. The method of claim 2, wherein the real time event data is processed by a specific video generation process and a specific video stream process.

4. The method of claim 1, further comprising receiving user data from a user source, wherein the user data is based on actions performed by at least one user while viewing the streamed video.

5. A system for real-time generation and streaming of a context based video said system comprising a non-transitory computer readable storage device and one or more processors operatively coupled to the storage device on which are stored modules of instruction code executable by the one or more processors, said modules comprising:

an interactive video module configured to, during a specific video generation process or video stream process:
receive real time data of a plurality of events from a mechanized, non-user, external source matched to an event type,
wherein each event is associated with a specific video generation process or video stream process,
wherein each event is identified by a unique event type,
wherein each video generation process or video stream process receives real-time event data based on a pre-defined set of data extraction mechanisms,
wherein the pre-defined set of data extraction mechanisms comprises checking current weather at a specified location, checking current local time, or receiving data from sensors,
identify a video generation template, comprising visual content, according to a received request from a computer terminal or remote entity, said received request including a template identifier that identifies the video generation template,
retrieve and validate input data based on the template identifier and user profile data, and
generate an undivided complete video stream, only after the received request is initiated, during the specific video generation process or video stream process, based on the identified video generation template by:
automatically selecting all parts, including at least two parts, of the visual content of the video template to be incorporated into the generated video stream, wherein the selected parts include only partial portions of the complete video stream, wherein only integration of all selected parts provides a playable video stream according to a predefined logic of the identified video generation template, said predefined logic including rules which define, in relation to received events, what new visual material is required;

wherein the predefined logic is different for each identified video generation template;
visual and audio material preparation modules configured to:
choose and generate audio and visual material items, and update respective visual and audio material items, and incorporate said visual and audio material items with the selected parts of the video template to complement the partial portions of the video stream to create the complete video stream, wherein only incorporation of all selected parts with the audio and visual material items provides a playable video stream according to the predefined logic of the identified video generation template, in relation to the real time data and input data, wherein each selected part of the video template is updatable with visual material items at any location of the screen;
wherein the updating of audio and visual material items is initiated at predefined time points of the video stream based on a template definition;
rendering and encoding modules configured to incorporate, during the specific video generation process or video stream process, the new or updated audio or visual material items into the selected parts of the video template at any location of the screen based on said video template, by generating and encoding video frames of the single generated undivided video stream, that incorporate the selected parts of the video template including the new or updated visual material items, produced during the specific video generation process or video stream process, such that the new or updated visual material items are part of the single generated undivided video stream formed from the video frames, where all video parts and visual material items of the single generated undivided video stream are visible to a user located at any location on the screen, so that the rendering and encoding modules render and encode the undivided video stream, from the selected parts of the video template incorporating the new and updated audio and visual material items, produced during the specific video generation process or video stream process, such that that new or updated video material items are combined into a single undivided stream of video; and
a video stream management module configured to provide the rendered and encoded video stream to an external entity, wherein the rendered and encoded video stream is a portion of a longer streamed video, while a subsequent portion of the longer streamed video is still in generation.

6. The system of claim 5, wherein the event type is identified by a match handling mechanism.

7. The system of claim 5, wherein the mechanized, non-user external sources include a remote communication server or remote sensors.

8. The system of claim 5, wherein the real-time user driven input data is based on actions performed by at least one user while viewing the streamed video.

* * * * *